United States Patent
Cheng et al.

(10) Patent No.: US 9,278,255 B2
(45) Date of Patent: Mar. 8, 2016

(54) SYSTEM AND METHOD FOR ACTIVITY RECOGNITION

(71) Applicants: General Instrument Corporation, Horsham, PA (US); Carnegie Mellon University, Pittsburgh, PA (US)

(72) Inventors: Heng-Tze Cheng, Sunnyvale, CA (US); Paul C. Davis, Arlington Heights, IL (US); Jianguo Li, Chicago, IL (US); Di You, Grayslake, IL (US)

(73) Assignees: ARRIS Enterprises, Inc., Suwanee, GA (US); Carnegie Mellon University, Pittsburgh, PA (US)

( * ) Notice: Subject to any disclaimer, the term of this patent is extended or adjusted under 35 U.S.C. 154(b) by 27 days.

(21) Appl. No.: 13/723,141

(22) Filed: Dec. 20, 2012

(65) Prior Publication Data

US 2014/0161322 A1 Jun. 12, 2014

Related U.S. Application Data

(60) Provisional application No. 61/735,011, filed on Dec. 9, 2012, provisional application No. 61/735,265, filed on Dec. 10, 2012.

(51) Int. Cl.
*G06K 9/00* (2006.01)
*A63B 24/00* (2006.01)

(52) U.S. Cl.
CPC . *A63B 24/00* (2013.01); *G06K 9/00* (2013.01); *G06K 9/00342* (2013.01)

(58) Field of Classification Search
None
See application file for complete search history.

(56) References Cited

U.S. PATENT DOCUMENTS

| 4,337,049 A | 6/1982 | Connelly |
| 5,848,396 A | 12/1998 | Gerace |
| 6,005,597 A | 12/1999 | Barrett et al. |

(Continued)

FOREIGN PATENT DOCUMENTS

| WO | 2010033346 A2 | 3/2010 |
| WO | 2010129165 A2 | 11/2010 |
| WO | 2012136462 A1 | 10/2012 |

OTHER PUBLICATIONS

Saad et al. "An Ontology for Video Human Movement Representation based on Benesh Notation" IEEE, May 2012, hereinafter Saad.*

(Continued)

*Primary Examiner* — Bhavesh Mehta
*Assistant Examiner* — Oneal R Mistry
(74) *Attorney, Agent, or Firm* — Stewart M. Wiener

(57) ABSTRACT

A method for automatic recognition of human activity is provided and includes the steps of decomposing human activity into a plurality of fundamental component attributes needed to perform an activity and defining ontologies of fundamental component attributes from the plurality of the fundamental component attributes identified during the decomposing step for each of a plurality of different targeted activities. The method also includes the steps of converting a data stream captured during a performance of an activity performed by a human into a sequence of fundamental component attributes and classifying the performed activity as one of the plurality of different targeted activities based on a closest match of the sequence of fundamental component attributes obtained during the converting step to at least a part of one of the ontologies of fundamental component attributes defined during the defining step. A system for performing the method is also disclosed.

19 Claims, 3 Drawing Sheets

(56) References Cited

U.S. PATENT DOCUMENTS

| | | | |
|---|---|---|---|
| 6,311,194 B1 | 10/2001 | Sheth et al. |
| 6,381,482 B1 | 4/2002 | Jayaraman et al. |
| 6,701,362 B1 | 3/2004 | Subramonian et al. |
| 6,727,914 B1 | 4/2004 | Gutta |
| 6,769,066 B1 | 7/2004 | Botros et al. |
| 6,801,909 B2 | 10/2004 | Delgado et al. |
| 6,839,680 B1 | 1/2005 | Liu et al. |
| 6,955,542 B2 | 10/2005 | Roncalez et al. |
| 6,970,731 B1 | 11/2005 | Jayaraman et al. |
| 6,988,093 B2 | 1/2006 | Pic et al. |
| 7,043,552 B2 | 5/2006 | Davis |
| 7,285,090 B2 | 10/2007 | Stivoric et al. |
| 7,421,369 B2 | 9/2008 | Clarkson |
| 7,505,951 B2 | 3/2009 | Thompson et al. |
| 7,599,955 B2 | 10/2009 | Yoon et al. |
| 7,620,894 B1 | 11/2009 | Kahn |
| 7,797,672 B2 | 9/2010 | Thompson et al. |
| 7,801,896 B2 | 9/2010 | Szabo |
| 7,818,329 B2 | 10/2010 | Campbell et al. |
| 7,865,354 B2 | 1/2011 | Chitrapura et al. |
| 7,870,489 B2 | 1/2011 | Serita et al. |
| 7,877,345 B2 | 1/2011 | Nigam et al. |
| 7,962,529 B1 | 6/2011 | Datar et al. |
| 8,033,959 B2 | 10/2011 | Oleson et al. |
| 8,033,996 B2 | 10/2011 | Behar |
| 8,090,727 B2 | 1/2012 | Lachtarnik et al. |
| 8,137,270 B2 | 3/2012 | Keenan et al. |
| 8,145,648 B2 | 3/2012 | Kunjithapatham et al. |
| 8,185,487 B2 | 5/2012 | Tuzhilin et al. |
| 8,200,323 B2 | 6/2012 | DiBenedetto et al. |
| 8,200,477 B2 | 6/2012 | Yi et al. |
| 8,335,803 B2 | 12/2012 | Abraham |
| 8,356,025 B2 | 1/2013 | Cai et al. |
| 8,428,357 B2* | 4/2013 | Stephenson ........ A63B 24/0003 348/135 |
| 8,478,712 B2 | 7/2013 | Thompson et al. |
| 8,620,964 B2 | 12/2013 | Tsatsou et al. |
| 8,838,435 B2 | 9/2014 | Talley et al. |
| 8,935,305 B2 | 1/2015 | Novak et al. |
| 8,943,015 B2 | 1/2015 | Davis et al. |
| 2002/0078090 A1 | 6/2002 | Hwang et al. |
| 2002/0184080 A1 | 12/2002 | Murad et al. |
| 2003/0018616 A1 | 1/2003 | Wilbanks et al. |
| 2003/0028871 A1 | 2/2003 | Wang et al. |
| 2003/0078811 A1 | 4/2003 | Cole et al. |
| 2003/0105658 A1 | 6/2003 | Chen et al. |
| 2004/0039564 A1 | 2/2004 | Mueller |
| 2004/0205648 A1 | 10/2004 | Tinsley et al. |
| 2004/0249866 A1 | 12/2004 | Chen et al. |
| 2005/0034107 A1 | 2/2005 | Kendall et al. |
| 2005/0071328 A1 | 3/2005 | Lawrence |
| 2005/0091038 A1 | 4/2005 | Yi et al. |
| 2005/0138177 A1 | 6/2005 | Davis |
| 2005/0149494 A1 | 7/2005 | Lindh et al. |
| 2005/0188408 A1 | 8/2005 | Wallis et al. |
| 2006/0053172 A1 | 3/2006 | Gardner et al. |
| 2006/0200341 A1 | 9/2006 | Corston-Oliver et al. |
| 2006/0218651 A1 | 9/2006 | Ginter et al. |
| 2007/0053513 A1 | 3/2007 | Hoffberg |
| 2007/0115979 A1 | 5/2007 | Balay et al. |
| 2007/0130350 A1 | 6/2007 | Alperovitch et al. |
| 2008/0005313 A1 | 1/2008 | Flake et al. |
| 2008/0021700 A1 | 1/2008 | Moitra et al. |
| 2008/0036917 A1 | 2/2008 | Pascarella et al. |
| 2008/0077614 A1 | 3/2008 | Roy |
| 2008/0133488 A1 | 6/2008 | Bandaru et al. |
| 2008/0177721 A1 | 7/2008 | Agarwal et al. |
| 2008/0275694 A1 | 11/2008 | Varone |
| 2008/0320553 A1 | 12/2008 | Balay et al. |
| 2009/0112910 A1 | 4/2009 | Picault et al. |
| 2009/0198642 A1 | 8/2009 | Akkiraju et al. |
| 2009/0234711 A1 | 9/2009 | Ramer et al. |
| 2009/0234878 A1 | 9/2009 | Herz et al. |
| 2009/0259459 A1 | 10/2009 | Ceusters et al. |
| 2009/0328133 A1 | 12/2009 | Strassner et al. |
| 2010/0017819 A1 | 1/2010 | Gerbrandt et al. |
| 2010/0030552 A1 | 2/2010 | Chen et al. |
| 2010/0050118 A1 | 2/2010 | Chowdhury et al. |
| 2010/0088151 A1 | 4/2010 | Kim et al. |
| 2010/0122178 A1 | 5/2010 | Konig et al. |
| 2010/0125483 A1 | 5/2010 | Davis et al. |
| 2010/0125543 A1 | 5/2010 | Thompson et al. |
| 2010/0191582 A1 | 7/2010 | Dicker et al. |
| 2010/0235908 A1 | 9/2010 | Eynon et al. |
| 2010/0274100 A1 | 10/2010 | Behar et al. |
| 2010/0281025 A1 | 11/2010 | Tsatsou et al. |
| 2010/0283630 A1 | 11/2010 | Alonso |
| 2010/0293221 A1 | 11/2010 | Sidman et al. |
| 2010/0318542 A1 | 12/2010 | Davis |
| 2011/0052005 A1* | 3/2011 | Selner ........................ 382/103 |
| 2011/0054270 A1 | 3/2011 | Derchak |
| 2011/0087670 A1 | 4/2011 | Jorstad et al. |
| 2011/0137906 A1 | 6/2011 | Cai et al. |
| 2011/0153042 A1 | 6/2011 | Burton et al. |
| 2011/0179084 A1 | 7/2011 | Waddington et al. |
| 2011/0249953 A1 | 10/2011 | Suri et al. |
| 2011/0256983 A1 | 10/2011 | Malack et al. |
| 2012/0041959 A1 | 2/2012 | Weissman et al. |
| 2012/0156991 A1 | 6/2012 | Burton et al. |
| 2012/0157263 A1 | 6/2012 | Sivak et al. |
| 2013/0132442 A1 | 5/2013 | Tsatsou et al. |
| 2013/0166494 A1 | 6/2013 | Davis et al. |
| 2013/0166605 A1 | 6/2013 | Li et al. |
| 2013/0166609 A1 | 6/2013 | Hao et al. |
| 2013/0179149 A1 | 7/2013 | Talley et al. |
| 2013/0179467 A1 | 7/2013 | Ain |
| 2013/0232145 A1 | 9/2013 | Weissman et al. |
| 2013/0254140 A1 | 9/2013 | Li et al. |
| 2013/0304469 A1 | 11/2013 | Kamada et al. |
| 2013/0346414 A1 | 12/2013 | Smith et al. |
| 2013/0347056 A1 | 12/2013 | Kuhlman et al. |
| 2013/0347057 A1 | 12/2013 | Hurwitz et al. |
| 2014/0089967 A1 | 3/2014 | Mandalia et al. |
| 2014/0095608 A1 | 4/2014 | Mandalia et al. |
| 2014/0161322 A1 | 6/2014 | Cheng et al. |
| 2014/0173075 A1 | 6/2014 | Liu et al. |
| 2014/0176604 A1 | 6/2014 | Venkitaraman et al. |
| 2014/0181160 A1 | 6/2014 | Novak et al. |
| 2014/0200906 A1 | 7/2014 | Bentley et al. |
| 2014/0258204 A1 | 9/2014 | Liu et al. |
| 2014/0266782 A1 | 9/2014 | You et al. |
| 2014/0280138 A1 | 9/2014 | Li et al. |
| 2014/0280529 A1 | 9/2014 | Davis et al. |
| 2015/0032682 A1 | 1/2015 | You et al. |

OTHER PUBLICATIONS

Raheb et al. "A Labanotation Based Ontology for Representing Dance Movement" IEEE, 2011, hereinafter Raheb.*

"Detecting Ventilatory Threshold with BioHarness™," Zephyr Technology, pp. 2 (2008).

"Fitbit Product Manual," last update on Mar. 29, 2010, pp. 23.

"Monitoring Under-training with the Zephyr PSM System," Zephyr Technology (2010).

"Nike + iPod Meet your new personal trainer," accessed http://www.apple.com/ipod/nike/, accessed on Jul. 15, 2011, pp. 7.

"Nike + iPod User Guide," Apple Inc, pp. 32 (2010).

"Nike+ Basketball-Training," Guide, pp. 16.

"Nike+ SportWatch GPS,"Quick Start Guide, pp. 42.

"OmniSense Falconview Integration," Zephyr Technology, pp. 2 (2011).

"Personal Health," accessed at http://www.proetex.org/final%20proetex%20learning/personal_health.htm, accessed on Jan. 15, 2013, pp. 7.

"Sports and Training," accessed at http://www.proetex.org/final%20proetex%20learning/Sports.htm, accessed on Jan. 15, 2013, pp. 3.

"Validity of BioHarness™ Heart Rate vs 3-lead ECG," Zephyr Technology, pp. 2 (2008).

Amft, O., et al., "Recognition of user activity sequences using distributed event detection," vol. 4793, Springer-Verlag, pp. 126-141 (2007).

(56) References Cited

OTHER PUBLICATIONS

Bai, J., et al., "Movelets: A dictionary of movement," Electronic Journal of Statistics, vol. 6, pp. 559-578 (2012).

Brezmes, T., et al., "Activity Recognition from Accelerometer Data on a Mobile Phone," Distributed Computing, Artificial Intelligence, Bioinformatics, Soft Computing, and Ambient Assisted Living, Lecture Notes in Computer Science, pp. 796-799 (2009).

Brezmes, T., et al., "User activity monitoring using conventional cell phones for IMCIC 2010," International Multi Conference on Complexity, Informatics and Cybernetics (IMCIC 2010), International Institute of Informatics and Systemics (IIIS), pp. 3 (Apr. 2010).

Cinaz, B., et al., "Towards Continuous Monitoring of Mental Workload," 5th International Workshop on Ubiquitous Health and Wellness, pp. 5, ACM (2010).

Collette, M., "With tentacles in many disciplines, capstone team merges engineering, design," accessed at http://www.northeastern.edu/news/2012/01/squid/, dated Jan. 4, 2012, pp. 3.

Electricfoxy, "Move: Precision in Movement," accessed at www.electricfoxy.com/move/index.html, accessed on Sep. 10, 2012, pp. 3.

Georgia Tech, "Georgia Tech researchers develop first "woven computer"," accessed at www.smartshirt.gatech.edu/images/wear.html, accessed on Jan. 15, 2012, pp. 2.

John, D., et al., "Calibrating a novel multi-sensor physical activity measurement system," Physiological Measurement, vol. 32, No. 9, pp. 1473-1489, Institute of Physics and Engineering in Medicine (2011).

Kasteren, T.V., et al., "Accurate Activity Recognition in a Home Setting," Proceedings of the 10th international conference on Ubiquitous computing, pp. 1-9 (2008).

Kerr, W., et al., "Activity Recognition with Finite State Machines," Proceedings of the Twenty-Second international joint conference on Artificial Intelligence, vol. 2, pp. 1348-1353 (2011).

Lampert, C.H., et al., "Learning to Detect Unseen Object Classes by Between-Class Attribute Transfer," IEEE Conference on Computer Vision and Pattern Recognition, pp. 951-958 (2009).

Lester, J., et al., "A Practical Approach to Recognizing Physical Activities," Pervasive Computing of the 4th International Conference, Springer-Verlag, pp. 1-16 (2006).

Maurer, U., et al., "Activity Recognition and Monitoring Using Multiple Sensors on Different Body Positions," Proceedings of the International Workshop on Wearable and Implantable Body Sensor Networks (BSN'06), IEEE, pp. 5 (2006).

Morris, S.J., et al., "A Compact Wearable Sensor Package for Clinical Gait Monitoring," Offspring, vol. 1, No. 1, pp. 7-15, Massachusetts Institute of Technology (2002).

Palatucci, M., et al., "Zero-Shot Learning with Semantic Output Codes," Neural Information Processing Systems, pp. 1-9 (2009).

Pärkkä, J., et al., "Activity Classification Using Realistic Data From Wearable Sensors," IEEE Tranactions on Information Technology in Biomedicine, vol. 10, No. 1, pp. 119-128, (Jan. 2006).

Philipose, M., et al., "The Probabilistic Activity Toolkit: Towards Enabling Activity-Aware Computer Interfaces," Intel Corporation, pp. 1-8 (2003).

Ravi, N., et al., "Activity Recognition from Accelerometer Data", Proceedings, The 20th National Conference on Artificial Intelligence and the 17th Innovative Applications of Artificial Intelligence Conference, pp. 1541-1546, American Association for Artificial Intelligence (2005).

Roggen, D., et al., "Collecting complex activity datasets in highly rich networked sensor environments," Proceedings of the Seventh International Conference on Networked Sensing Systems (INSS), pp. 8 (2010).

Schwarz, L.A., et al., "Multiple-Activity Human Body Tracking in Unconstrained Environments," Proceedings of the 6th international conference on Articulated motion and deformable objects, pp. 10 (2010).

Sorber, J., et al., "An Amulet for Trustworthy Wearable mHealth," roceedings of the Twelfth Workshop on Mobile Computing Systems & Applications, pp. 6, ACM (2012).

Stack, K., "In-Chest Sensors Gather Data on NFL Prospects," accessed at http://www.wired.com/playbook/2011/02/nfl-combine-chest-sensors/all/1, dated Feb. 23, 2011, pp. 11.

Stikic, M., et al., "Weakly supervised recognition of daily life activities with wearable sensors," IEEE Transactions on Pattern Analysis and Machine Intelligence, vol. 33, Issue 12, pp. 2521-2537 (2011).

Sung, M., et al, "A Shiver Motion and Core Body Temperature Classification for Wearable Soldier Health Monitoring Systems," 9th IEEE International Symposium of Wearable Computers (ISWC'04), vol. 1, pp. 4 (2004).

Sung, M., et al, "LiveNet: Health and Lifestyle Networking Through Distributed Mobile Devices," Workshop on Applications of Mobile Embedded Systems (WAMES '04) at Mobisys '04, pp. 3 (2004).

Sung, M., et al., "Minimally-Invasive Physiological Sensing for Human-Aware Interfaces," HCI International, pp. 10, ACM (2005).

Sung, M., et al., "Wearable Feedback Systems for Rehabilitation", Journal of NeuroEngineering and Rehabilitation, pp. 12 (2005).

Varkey, J.P., et al., "Human motion recognition using a wireless sensor-based wearable system," vol. 16, Issue 7, pp. 897-910 (2012).

Varkey, J.P., et al., "Movement Recognition Using Body Area Networks," IEEE Global Telecommunications Conference, pp. 6 (2009).

Woyke, E., "AT&T Plans to Sell Health-Tracking Clothing," accessed at www.forbes.com/sites/elizabethwoyke/2011/10/28/att-plans-to-sell-health-tracking-clothing/print/, dated Oct. 28, 2011, pp. 2.

Nike, "The Nike+ FuelBand User's Guide", URL: support-en-us.nikeplus.com/ci/fattach/get/276180/0/filename/FuelBand__Manual__Online__ENG__edit12b_rev.pdf, accessed Jan. 18, 2013, last updated Nov. 2012.

Heng-Tze Cheng, et al. "Nuactiv: Recognizing unseen new activities using semantic attribute-based learning." In Proceedings of the 11th Annual International Conference on Mobile Systems, Applications, and Services, pp. 361-374. ACM, Jun. 2013.

Heng-Tze Cheng, et al. "Towards zero-shot learning for human activity recognition using semantic attribute sequence model." In Proceedings of the 2013 ACM International Joint Conference on Pervasive and Ubiquitous Computing, pp. 355-358. ACM, Sep. 2013.

Heng-Tze Cheng, "Learning and Recognizing the Hierarchical and Sequential Structure of Human Activities." Carnegie Mellon University: Dissertations (Paper 293). Dec. 2013.

* cited by examiner

SYSTEM AND METHOD FOR ACTIVITY RECOGNITION

BACKGROUND

Automatic recognition of user activity can be used in numerous context-aware applications and technologies, such as, applications which provide recommendations, user profiling, health/wellness applications, and smart-home applications. For example, automatic recognition of user activity is useful with respect to providing context-based targeted advertising and activity-aware multimedia content recommendations such as shopping recommendations specifically targeted to users known to be involved in certain activities. Further examples include healthcare and activity monitoring for patients, elders, and children, life logging applications and automatic status updating of social networks, and technologies relating to proactive personal assistants which take into account current user activities and activity history of the user.

For purposes of automatically recognizing the activity of a user, the conventional approach is to collect and label a set of training data for each class of user activity that needs to be recognized and to match current activity sensor readings to readings expected for one of a plurality of pre-defined classes of targeted activities of interest. However, such an approach necessarily requires training data for each of the activities desired to be recognized and, if there is no training data for a particular activity, a proper match to such an activity cannot be made. Thus, an activity of interest which is considered "previously unseen" with respect to the acquisition of appropriate training data cannot be recognized.

Furthermore, labeled examples and training data are typically extremely time consuming and expensive to develop and/or acquire and require significant efforts of human annotators and/or experts for such data to be useful in predicting activity performed by a user based on sensor readings. Thus, the ability to expand successful recognition to additional activities of interest is difficult and requires significant investment.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Figure 1:
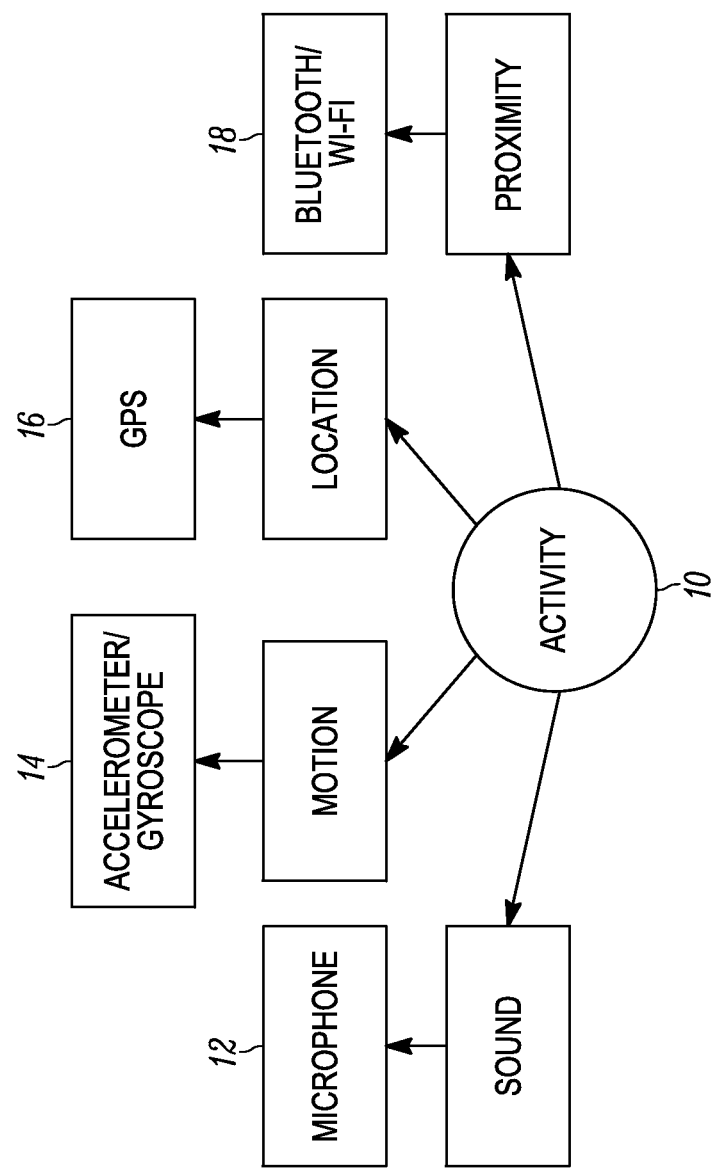
FIG. 1 is a diagram of an array of sensors capturing data in accordance with an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Embodiments are disclosed herein with respect to methods and systems for use in automatically recognizing human activity from some form of input sensor data captured relative to the activity actually performed. In addition, the embodiments are able to recognize an activity of interest from the input sensor data even when the activity is considered "previously unseen" where there may be little or no training data and examples developed that correspond to the activity of interest targeted for recognition.

In one embodiment, a method for automatic recognition of human activity is provided and includes the steps of decomposing human activity into a plurality of fundamental component attributes needed to perform the activity and defining ontologies of fundamental component attributes from the plurality of the fundamental component attributes identified during the decomposing step for each of a plurality of different targeted activities. The method also includes the steps of converting a data stream captured during a performance of an activity performed by a human into a sequence of fundamental component attributes and classifying the performed activity as one of the plurality of different targeted activities based on a closest match of the sequence of fundamental component attributes obtained during the converting step to at least a part of one of the ontologies of fundamental component attributes defined during the defining step.

In another embodiment, a method of automatically recognizing a physical activity being performed by a human is provided and includes the step of electronically decomposing training data obtained for each of a plurality of different physical activities within a training set of physical activities into a plurality of component attributes needed to perform the physical activities within the training set. The method also includes the step of defining ontologies of component attributes from the plurality of component attributes identified during the decomposing step for each of a plurality of different physical activities within a targeted set of different physical activities. The targeted set is different from the training set and may include physical activities not included in the training set. The method further includes the steps of electronically capturing a data stream representing an actual physical activity performed, electronically converting the data stream obtained during the capturing step into a plurality of component attributes, and automatically classifying the actual physical activity being performed by comparing the plurality of component attributes obtained during the converting step to one of the ontologies of component attributes defined during the defining step.

In a further embodiment, a system for automatically recognizing physical activity of a human is provided. The system includes a feature extractor and an attribute-based activity recognizer. The feature extractor is configured to receive electronic input data captured by a sensor relative to a physical activity and to identify features from the input data. The attribute-based activity recognizer has an attribute detector for electronically determining an attribute as defined by a sequence of features and an activity classifier for classifying and outputting a prediction of the physical activity based on at least one of a sequence and combination of the attributes determined by the attribute detector.

In general, the embodiments are configured to recognize human activities from user data and, from such data, recognize so-called "previously unseen" activity classes where no training samples or training data has been developed in advance. Thus, while conventional supervised activity recognition may be limited to activity classes contained within a set of training data, the semantic attribute-based learning framework of the embodiments disclosed herein generalize and decompose knowledge into fundamental components for the purpose of being able to recognize "previously unseen" activity. For purposes of this description, a "previously unseen" or "unseen" activity is one in which training data has not been developed in advance or does not exist for the activity of interest being recognized.

According to the embodiments, a human activity is represented by or, decomposed into, a sequence and/or combination of semantic attributes or fundamental components. Attributes learned for recognizing one particular activity are transferred for use in recognizing other different activities. Merely for purposes of example, a particular body position or body movement of the user may be defined as one of several attributes that can be used to define a particular human activity. This same body position or body movement (i.e., attribute) may also be accomplished when performing other activities. Thus, the attribute learned for one activity can be used in defining and recognizing a different activity having a common attribute.

Readily nameable semantic attributes are used to permit a new or previously unseen activity to be described efficiently in so-called "attribute space" instead of requiring extensive efforts with respect to the development of appropriate training data. Thus, a "previously unseen" activity (i.e., an activity in which training data was not acquired in advance) is defined from a list of attributes collected and identified from training data of other activities. In this manner, a "previously unseen" activity having little or no corresponding training examples can be automatically recognized from a unique combination or sequence of attributes learned from other activities.

Thus, as described above, fundamental attributes are learned and then shared for use in recognizing various different human activities. In this manner, new activities that are rarely seen or previously unseen can be recognized because many activity types share the same underlying components thereby permitting a statistical model of a basic activity component to be transferred and used to recognize other activities. In this approach, limits with respect to supervised learning (i.e., the collection and development of training data) can be overcome by incorporating human knowledge with respect to the fundamental components known to comprise an activity of interest. Thus, rather than collecting sensor data and developing labels for every activity type, the use of nameable attributes permits humans to describe an activity type based on a combination or sequence of fundamental attributes without the process of sensor training data collection.

A step in the above described process is to decompose human activity into a sequence or combination of attributes. The semantic attributes are subject to organization and ontology for use in defining targeted activities of interest for recognition. Zero-shot learning techniques can be used for recognizing activities from sequential data.

For purposes of illustration, FIG. 1 shows various forms of data that may be collected when a human performs an activity of interest that is desired to be automatically recognized. For example, when the human performs activity 10, a microphone 12 may record sound data, a motion detector or sensor such as an accelerometer or gyroscope 14 worn on the user may record motion data, a GPS sensor 16 may record location data, and a device 18 utilizing BLUETOOTH or Wi-Fi communication technologies may record proximity data. Of course, other sensors and types of data may also be recorded, such as video recordings of the activity, ambient signatures such as temperature, ambient lighting conditions, barometric pressure, and altitude, and the like.

Figure 2:
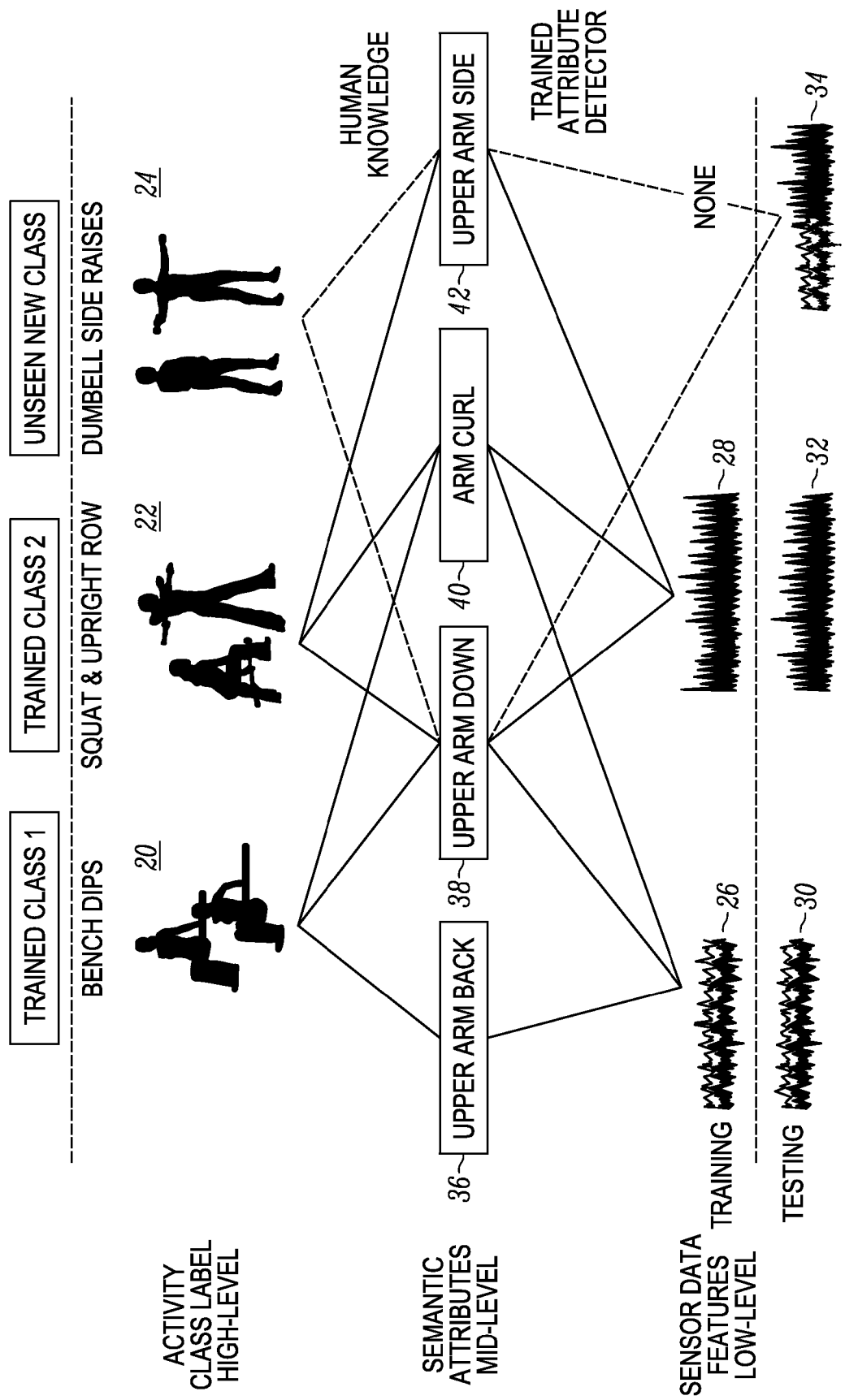
FIG. 2 is a diagram showing the interrelation of low-level sensor data, mid-level attributes, and high-level activity classes for three different exercises in accordance with an embodiment.

An example is provided in FIG. 2 in which the targeted activities of interest for being automatically recognized are exercises, for instance, calisthenics and free-weight exercises. In particular, the exercises in the group illustrated in FIG. 2 include bench dips 20, squat and upright row 22, and dumbbell side raises 24. In this example, these three exercises 20, 22 and 24 are referred to as high-level activity class labels. In this example, training data 26 and 28 has been collected and/or acquired in advance for each of the high-level activity class labels of bench dips 20 and squat and upright row 22 so that these activity classes 20 and 22 can be recognized directly from sensor data based on a comparison of sensor data captured when a user performs the activity to the existing training data for these exercises. However, the high-level activity class of dumbbell side raises 24 is an "unseen" or "previously unseen" activity class that has no corresponding training data. See the word "None" in FIG. 2.

Accordingly, low-level sensor data features are shown at the bottom of FIG. 2 and include pre-obtained training data 26 and 28 for the bench dips 20 and squat and upright row 22 activity classes, respectively, and testing data 30, 32, and 34 for each of exercises 20, 22 and 24, respectively, which are recorded by sensors such as shown in FIG. 1 during the performance of an activity to which activity recognition is desired. Of significance, the dumbbell side raises activity class 24 has no training data as discussed above and therefore cannot simply be recognized based on a comparison of sensor testing data to stored and pre-obtained training data.

According to the embodiment, mid-level semantic attributes are determined by decomposing the pre-obtained training data. For example, the positioning of the arm of the exerciser between an upper arm back position 36, an upper arm down position 38, and an arm curl position 40 can be identified as fundamental attributes of the bench dips activity class 20 based on human knowledge of a bench dips exercise and based on decomposition of the low-level features of training data 26. Likewise, the positioning of the arm of the exerciser between an upper arm down position 38, an arm curl position 40, and an upper arm side position 42 can be identified as fundamental attributes of the squat and upright row activity class 22 based on human knowledge of a squat and upright row exercise and based on decomposition of the training data 28. These same four semantic attributes 36, 38, 40 and 42 can be used not only to recognize bench dips 20 and squat and upright row 22 exercises, but also to recognize other activities such as the dumbbell side raises activity class 24 for which no training data has been collected.

For purposes of recognizing the dumbbell side raises activity class 24, human knowledge alone of the mid-level semantic attributes can be used. For instance, it would be known that the dumbbell side raises activity class 24 involves arm positions including a repeating sequence of an upper arm down position 38 followed by and an upper arm side position 42. Thus, only information relative to the mid-level semantic attributes need entry into a device and/or database used to recognize the activity. In this manner, when the testing data 34 is analyzed, its features can be transformed or mapped into these attributes and a comparison of attributes only (i.e., in attribute space) can be performed. The result is recognition of a dumbbell side raises activity class 24 without the requirement of pre-obtained training data.

The above example can be quickly and efficiently expanded upon to greatly increase the number of high-level activity classes that may be recognized based on only a small collection of learned mid-level semantic attributes (i.e., learned from training data of just a few high-level activity classes). For example, in Table 1 provided below, semantic attributes for arm up, arm down, arm forward, arm backward, arm side, arm curl and squat and stand-up can be learned and various high-level activity classes can then be defined and targeted based on knowledge of just these few fundamental attributes. Table 1 lists high-level activity classes including bench dips, squat and upright row, dumbbell side raises, dumbbell shoulder press, dumbbell curl, triceps extension, chest press, push-up, dumbbell fly and deadlift. If the activity class includes the semantic attribute, a "1" is entered in the table and, if the activity class does not include the semantic attribute, a "zero" is entered in the table. If desired, recognition can be based on a combination of attributes or a sequence can be defined and the recognition can be based on a particular performance of a sequence of attributes.

TABLE 1

| Activity Class | Arm Up | Arm Down | Arm Forward | Arm Backward | Arm Side | Arm Curl | Squat & Stand Up |
|---|---|---|---|---|---|---|---|
| Bench Dips | 0 | 1 | 0 | 1 | 0 | 0 | 0 |
| Squat & Upright Row | 0 | 1 | 0 | 0 | 1 | 0 | 1 |
| Dumbbell Side Raises | 0 | 1 | 0 | 0 | 1 | 0 | 0 |
| Dumbbell Shoulder Press | 1 | 0 | 0 | 0 | 1 | 0 | 0 |
| Dumbbell Curl | 0 | 1 | 0 | 0 | 0 | 1 | 0 |
| Triceps Extension | 1 | 0 | 0 | 0 | 0 | 0 | 0 |
| Chest Press | 0 | 0 | 1 | 0 | 1 | 1 | 0 |
| Push Up | 0 | 1 | 0 | 0 | 0 | 0 | 0 |
| Dumbbell Fly | 0 | 0 | 0 | 1 | 1 | 0 | 0 |
| Deadlift | 0 | 1 | 0 | 0 | 0 | 0 | 1 |

In Table 1 shown above, any number of different exercises (i.e. activity classes) can be quickly added to the list that can be recognized and identified based on the above set of semantic attributes, in this case, arm or body positions that can be recognized by sensors. Such sensors can be worn on the body of the exerciser or can record video or the like of the exerciser. Of course, other sensor data can also be utilized such as relating to the location of the user at a gym or the like, the temperature and/or heart rate of the user, as well as other environmental or contextual data.

FIG. 2 is provided for purposes of example only. The targeted activity classes of interest are not limited to exercises and can be related to any activity desired to be targeted, for instance, activities or chores performed in the home or at work, activities performed and monitored for medical reasons, activities relating to hobbies or recreational activities, or the like.

Recognition of performance of high-level activity classes and/or a sequence of the performance of such activity classes can be used to further recognize higher-level activity classes. In FIG. 2, the performance of a particular higher-level workout routine involving the performance of numerous of the high-level activity classes in a particular sequence can be recognized.

Figure 3:
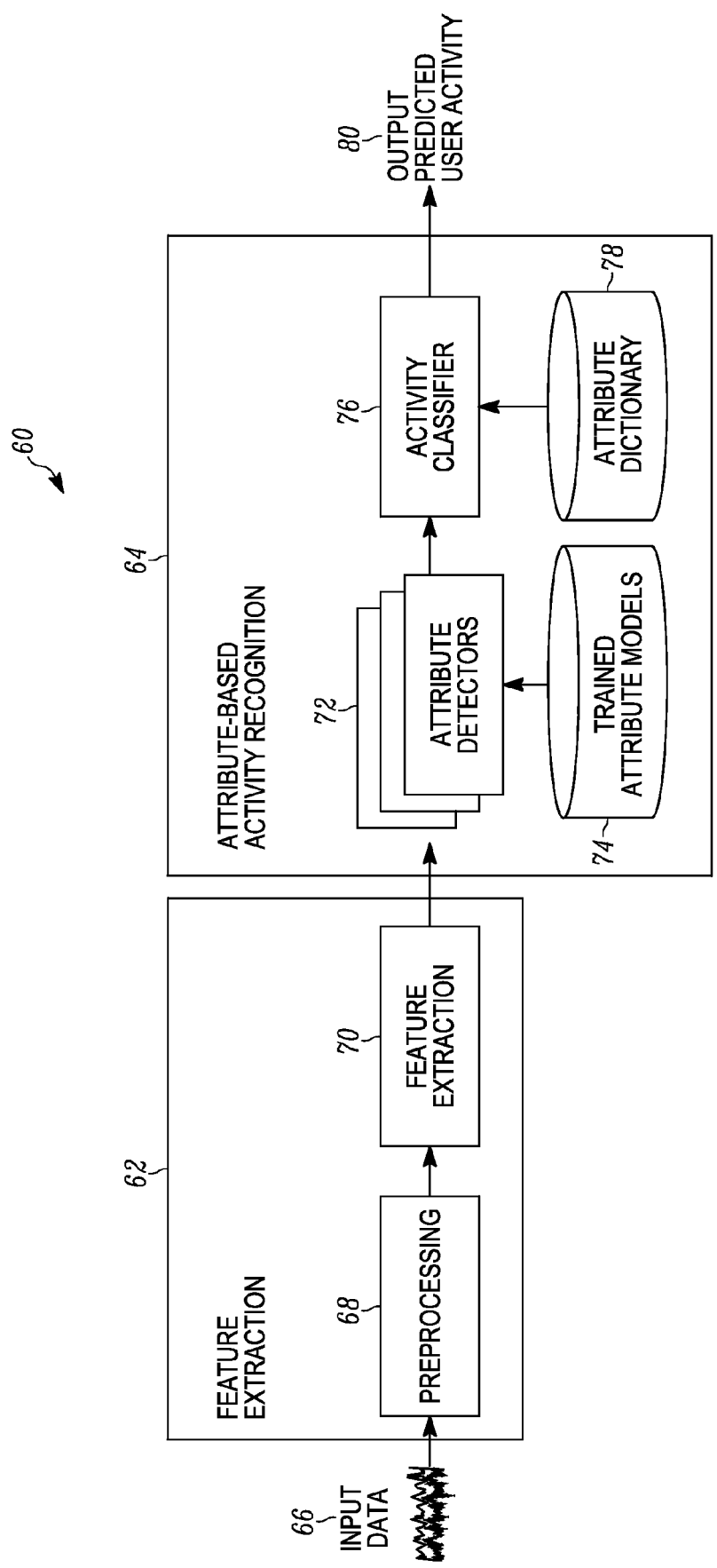
FIG. 3 is a schematic diagram of a system of recognizing activities in accordance with an embodiment.

A system or device 60 according to one contemplated embodiment is shown in FIG. 3 for automatically recognizing activity. The system 60 includes a feature extraction unit 62 and an attribute-based activity recognition unit 64. The feature extraction unit 62 is configured to receive a stream of input data 66 such as captured by sensors or the like during a performed activity that is desired to be automatically recognized. The input signal 66 is processed in a preprocessing module 68 and features are extracted from the input signal in a feature extraction module 70. Information concerning the extracted features is supplied to the attribute-based activity recognition unit 64, in particular, to an attribute detector module 72. The attribute detector module 72 compares the features to trained attribute models stored in a database 74 to identify the fundamental attributes and/or sequence thereof and provides such information to an activity class module 76. The activity class module 76 compares the attributes or sequence thereof to sets of attributes stored in an attribute dictionary database 78 to identify the activity class recognized. The system 60 can then output a predicted user activity 80.

The input data or signal 66 can be sensor data, software usage data, text data, or any combination of the above. Appropriate sampling rate and granularity of segmentation can be determined and used based on the nature of the activity domain of particular interest and the input data types. For example, a 30 Hz sampling rate may be used for motion sensors (accelerometer and gyroscope) and a sliding window of one second length with 50% overlap can be used for analyzing exercise activity. Of course, these may be modified for other activities where motions may tend to occur at quicker or slower rates. As one alternative, parameters can be decided by cross-validations using different parameters and then by selecting an optimal configuration.

The feature extraction unit 62 may compute features directly from the input data 66 in the time domain and the frequency domain. Such computations may include, but are not limited to: mean, standard deviation, pair-wise correlation, cross correlation, slope, zero-crossing rate, Fourier transform coefficients, spectral flux, and the like.

With respect to organizing semantic attributes, an offline human determination may be made as to how the attributes are organized or composed for the targeted activity domain of interest. For instance, in FIG. 2, it is known by a human without the need of training data that the fundamental attributes of dumbbell side raises 24 includes a repeating sequence of upper arm down 38 and upper arm side 42 positioning. The ontology and relationship between target activities classes and attributes can readily be defined as discussed above with an attribute table (see Table 1 above) where each row of the table represents an activity class and each column corresponds to an attribute. Each table entry can be zero or one indicating whether or not an attribute is part of the activity. For example, in the domain of exercise activity, "Dumbbell Side Raises" can be described as: ArmUp=0; ArmDown=1; ArmForward=0; ArmBackward=0; ArmSide=1; Arm Curl=0; and Squat&StandUp=0. As an alternative, the table entry can be real-valued or in percentages representing the likelihood or confidence that an attribute is associated with the activity.

As another alternative for defining the ontology and relationship between targeted activities of interest, classes and attributes can be defined with a hierarchical attribute graph. Here, the relationship between activities and attributes may be modeled as a tree-like structure. Each activity can be first decomposed into a set of general attributes, which can be further decomposed into fine-grained attributes. A high-level/composite activity can also consist of a combination of lower-level activities and/or attributes. By way of example, a higher-level activity may be identified based on a sequence of recognized high-level exercise activity classes.

The above referenced attribute table and hierarchical attribute graph may be constructed by leveraging expert knowledge in the activity domain, crowd-sourced from the web, or by mining text data related to the activity on the web. Thus, entries of high level activity classes or even higher-level activities can be added quickly to these tables and graphs based on only a small number of attributes being learned from the acquisition of training data.

A classifier or attribute detector (e.g. Support Vector Machine, Decision Tree, Naive Bayes, etc.) can be trained to recognize for each attribute from a set of pre-obtained training data and can be stored in the form of a database or the like. For instance, see database 74 in FIG. 3. The output of the classifiers can either be binary values (i.e., positive/negative response) or continuous values (i.e., representing the confidence of predictions). Classifier outputs can then be aggregated to generate an attribute vector.

The activity class, whether subject to training data or not, can be searched based on the closest match in attribute space (not via training data). For example, Nearest Neighbor Classifier can be used to match the detected attribute vector with the attribute dictionary (see the activity classifier module 76 and attribute dictionary database 78 in FIG. 3). To model the temporal continuity of the nature of human activity, the output activities of neighboring windows (e.g. five windows) can be combined and a weighted majority vote can be used to predict the final output activity 80.

As a further alternative based on leveraging both the discriminative power of the feature space (i.e., training data) and the generality of the attribute space, a hybrid feature/attribute-based classification can be designed and utilized to determine when to apply the attribute-based activity recognition. Here, a binary classifier can be trained in the feature space where a first set of activity classes include samples or training data from all seen activity classes (i.e., having associated training data) and where a second set of activity classes represents any activity class that is unseen and does not have corresponding training data. If the incoming sample is detected as an unseen class, then only unseen classes (i.e., the second set of classes) in the attribute space are selected and an attribute-based activity classification is performed. Otherwise, a feature-based activity classification is performed with the first set of activity classes.

For purposes of modeling the temporal dependency where the input data are time-sequences, a zero-shot learning framework for sequential data can be used. Each activity class is modeled as a sequence of attributes (i.e., not merely a combination of detected attributes). The transition probability between attributes is trained by real data and domain knowledge. Each attribute is further modeled as a sequence of low-level feature observations, which are derived from the input data as previously discussed. To recognize the attributes and activity, the system searches for the optimal attributes and activity labels at each time slice so that the overall data likelihood within the sampled window is maximized.

Accordingly, based on the above described system and method, human activity detection using a combination of electronic body motion sensors, video recording apparatus, and/or other contextual and environmental sensors can be used to obtain a stream of input data capturing an actual performance or consequences of a performance of an activity of interest which is desired to be automatically recognized. Training models for individual "attributes" are defined and semantically labeled, and look-up tables or the like can then be created that map the labeled attribute combinations and/or sequences to specific activities.

A hybrid approach can also be utilized, for instance, via whole-activity model matching followed by attribute-level matching if activity is unrecognized. A combination of machine learning and a rules-based expert system enables detection of un-modeled activity classes by means of modeled fundamental attributes. Thus, the embodiments provide the ability to detect activities for which no training has been performed, but which may be inferred from detecting component movements or the like known to compose the activity.

The output of the predicted user activity can be used in making recommendations, profiling, health/wellness applications, smart home applications, and the like. Specific examples may include context-based targeted advertising, activity-aware multimedia content recommender or shopping recommender, healthcare and activity monitoring for patients, elders, and children, life logging applications and automatic status update for social network, and proactive personal assistant based on the current activity and activity history of the user.

The above referenced systems, devices, units, modules, detectors, classifiers, extractors, pre-processing units, storage devices and the like for carrying out the above methods can physically be provided on a circuit board or within another electronic device and can include various processors, microprocessors, controllers, chips, disk drives, and the like. It will be apparent to one of ordinary skill in the art that the systems, devices, units, modules, processors, controllers, detectors, classifiers, extractors, pre-processing units, storage devices, and the like may be implemented as electronic components, software, hardware or a combination of hardware and software.

In the foregoing specification, specific embodiments have been described. However, one of ordinary skill in the art appreciates that various modifications and changes can be made without departing from the scope as set forth in the claims below. Accordingly, the specification and figures are to be regarded in an illustrative rather than restrictive sense.

We claim:

1. A method for automatic recognition of human activity, comprising the steps of:
    decomposing a human activity into a plurality of fundamental component attributes needed to perform the human activity, wherein the human activity is included in a training set of activities;
    defining ontologies of fundamental component attributes from the plurality of the fundamental component attributes identified during said decomposing step for each of a plurality of different targeted activities;
    converting a data stream, the data stream captured during a performance by a human of a performed activity, into a sequence of fundamental component attributes; and
    classifying the performed activity as one of the plurality of different targeted activities based on a closest match of the sequence of fundamental component attributes obtained during said converting step to at least a part of one of the ontologies of fundamental component attributes defined during said defining step, wherein the performed activity is not included in the training set of activities, the classifying comprising selecting only unseen classes in an attribute space;
    wherein each of the fundamental component attributes is defined from a sequence of features, and further comprising the step of extracting features from the data stream with computations in at least one of time domain and frequency domain; and
    wherein the data stream provides a time-sequence of features, and wherein, during said classifying step, a feature at each time slice of the data stream is compared to features of the fundamental component attributes at a corresponding time slice within the ontologies to determine a closest match.

2. The method according to claim 1, wherein the plurality of fundamental component attributes include attributes corresponding to at least one of a body motion and a body position.

3. The method according to claim 1, wherein the data stream is an electronic data stream including data captured by at least one motion sensor worn on the human during the performance of the performed activity.

4. The method according to claim 1, wherein the data stream is video data of the human during the performance of the performed activity.

5. The method according to claim 1, wherein said step of defining ontologies includes entry of a combination of fundamental component attributes in a database for each of the plurality of different targeted activities.

6. The method according to claim 1, wherein each of the different targeted activities includes a unique sequence and combination of fundamental component attributes.

7. A method of automatically recognizing a physical activity being performed by a human, comprising the steps of:
electronically decomposing training data obtained for each of a plurality of different physical activities within a training set of physical activities into a plurality of component attributes needed to perform the physical activities within the training set;
defining ontologies of component attributes from the plurality of component attributes identified during said decomposing step for each of a plurality of different physical activities within a targeted set of different physical activities, the targeted set being different from the training set, wherein the plurality of different physical activities within the targeted set includes at least one physical activity not included within the training set;
electronically capturing a data stream representing an actual physical activity performed;
electronically converting the data stream obtained during said capturing step into a plurality of component attributes; and
automatically classifying the actual physical activity being performed by comparing the plurality of component attributes obtained during said converting step to one of the ontologies of component attributes defined during said defining step; wherein the automatically classifying further comprises classifying the actual physical activity for at least one class of physical activity wherein at least one of the component attributes has not been included within the training set, the classifying comprising selecting only unseen classes in an attribute space;
wherein each of the component attributes is defined from a sequence of features, and further comprising the step of extracting features from the data stream with computations in at least one of time domain and frequency domain; and
wherein the data stream provides a time-sequence of features, and wherein, during said classifying step, a feature at each time slice of the data stream is compared to features of the component attributes at a corresponding time slice within the ontologies to determine a closest match.

8. The method according to claim 7, wherein the plurality of different physical activities within the training set is a subset of the plurality of different physical activities within the targeted set.

9. The method according to claim 7, wherein the data stream includes data captured by at least one input source selected from a group consisting of a motion sensor, a video recorder, a sound recording device, a location sensor, a temperature sensor, a pressure sensor, an ambient light sensor, a heartrate sensor, and a proximity sensor.

10. The method according to claim 7, wherein the features are extracted by computations in at least one of time domain and frequency domain, and wherein the computations include at least one of mean, standard deviation, pair-wise correlation, cross correlation, slope, zero crossing rate, Fourier transform coefficients, and spectral flux.

11. The method according to claim 7, further comprising the steps of:
determining if there is a match of the features extracted from the data stream obtained during said capturing step to features produced by the training data for one of the plurality of different physical activities within the training set;
if there is a match to one of the plurality of different physical activities within the training set, a matched physical activity within the training set is recognized as the actual physical activity; and
if there is not a match to one of the plurality of different human physical activities within the training set, said converting and classifying steps are performed to predict a physical activity from the targeted set.

12. The method according to claim 7, wherein said step of defining ontologies includes entry of a combination of component attributes in a database for each physical activity without training data.

13. The method according to claim 7, wherein the component attributes include attributes corresponding to one of a body motion and body position, and wherein each of the different physical activities is composed of a unique sequence and combination of component attributes.

14. The method according to claim 7, wherein a sequence and combination of the different physical activities corresponds to a higher level activity, and further comprising the step of recognizing the higher level activity based on the sequence and combination of physical activities classified during said classifying step.

15. A system for automatically recognizing physical activity of a human, comprising:
a feature extractor configured to receive electronic input data captured by a sensor relative to a physical activity and to identify features from the input data; and
an attribute-based activity recognizer having:
an attribute detector for electronically determining an attribute as defined by a sequence of features, and
an activity classifier for classifying and outputting a prediction of the physical activity based on at least one of a sequence and combination of the attributes determined by the attribute detector;
wherein the activity recognizer has access to a database of a plurality of different attributes developed from training data for use in identifying attributes based on identified features, and is further configured to classify and output a prediction of the physical activity for at least one class of physical activity wherein at least one of the attributes determined by the attribute detector has not been included within the training data, the classifying comprising selecting only unseen classes in an attribute space;
wherein each of the attributes is defined from a sequence of features, and the activity recognizer is further configured to extract features from a data stream with computations in at least one of time domain and frequency domain; and wherein the data stream provides a time-sequence of features, and wherein the activity recognizer is further configured to, during said classifying, compare a feature at each time slice of the data stream to features of the attributes at a corresponding time slice within the ontologies to determine a closest match.

16. A system according to claim 15, wherein at least some of the attributes define at least one of a body motion and a body position.

17. A system according to claim 16, wherein said feature extractor is configured to extract the features from the input data via computations in at least one of time domain and frequency domain, and wherein the computations include at least one of mean, standard deviation, pair-wise correlation, cross correlation, slope, zero crossing rate, Fourier transform coefficients, and spectral flux.

18. A system according to claim 16, wherein the physical activity is defined as a unique sequence and combination of attributes, and wherein the activity recognizer includes a database of a plurality of different physical activities defined as being composed of different sequences and combinations of attributes.

19. A system according to claim 16, further comprising a sensor for capturing data relative to the physical activity.

* * * * *